(12) United States Patent
Hinman et al.

(10) Patent No.: US 7,535,880 B1
(45) Date of Patent: May 19, 2009

(54) METHOD AND APPARATUS FOR CONTROLLING WIRELESS ACCESS TO A NETWORK

(75) Inventors: Brian L. Hinman, Los Gatos, CA (US); Pasquale Romano, Los Gatos, CA (US); Philip Bednarz, Fremont, CA (US)

(73) Assignee: 2Wire, Inc., San Jose, CA (US)

( * ) Notice: Subject to any disclaimer, the term of this patent is extended or adjusted under 35 U.S.C. 154(b) by 467 days.

(21) Appl. No.: 11/036,303

(22) Filed: Jan. 13, 2005

(51) Int. Cl.
*H04W 4/00* (2006.01)

(52) U.S. Cl. ...................................... 370/338

(58) Field of Classification Search ............... 370/338, 370/342, 328; 455/439, 69, 414.1, 433; 709/226, 709/227
See application file for complete search history.

(56) References Cited

U.S. PATENT DOCUMENTS

| | | | |
|---|---|---|---|
| 5,455,953 A | 10/1995 | Russell | |
| 5,553,242 A | 9/1996 | Russell et al. | |
| 5,600,312 A | 2/1997 | Willard et al. | |
| 5,610,919 A | 3/1997 | Willard et al. | |
| 5,625,351 A | 4/1997 | Willard et al. | |
| 5,740,533 A | 4/1998 | Lin | |
| 5,745,481 A | 4/1998 | Phillips et al. | |
| 6,510,463 B1 | 1/2003 | Farhat et al. | |
| 6,717,950 B2* | 4/2004 | Lui et al. | 370/408 |
| 6,732,176 B1 | 5/2004 | Stewart et al. | |
| 7,269,653 B2* | 9/2007 | Mentze et al. | 709/227 |
| 2002/0022483 A1* | 2/2002 | Thompson et al. | 455/439 |
| 2002/0101848 A1* | 8/2002 | Lee et al. | 370/349 |
| 2002/0163933 A1* | 11/2002 | Benveniste | 370/465 |
| 2004/0030926 A1* | 2/2004 | Clark | 713/201 |
| 2004/0073674 A1* | 4/2004 | Vergnaud et al. | 709/226 |
| 2004/0103282 A1* | 5/2004 | Meier et al. | 713/171 |
| 2004/0203648 A1* | 10/2004 | Wong | 455/414.1 |
| 2004/0203658 A1 | 10/2004 | Narayanan | |
| 2005/0091357 A1* | 4/2005 | Krantz et al. | 709/223 |
| 2005/0128989 A1* | 6/2005 | Bhagwat et al. | 370/338 |
| 2005/0147073 A1* | 7/2005 | Hietalahti et al. | 370/338 |

(Continued)

FOREIGN PATENT DOCUMENTS

EP     1379030 A     1/2004

(Continued)

OTHER PUBLICATIONS

U.S. Appl. No. 11/035,452, Office Action dated Jun. 14, 2007, 14 pages.

(Continued)

*Primary Examiner*—Lester Kincaid
*Assistant Examiner*—Nathan Mitchell
(74) *Attorney, Agent, or Firm*—Blakely, Sokoloff, Taylor & Zafman LLP

(57) ABSTRACT

A wireless access point includes at least a first service set identifier associated with a public LAN. The wireless access point provides wireless access to the public LAN and to a wide area network (WAN). The wireless access point implements an access policy that provides unrestricted access to the WAN to a first type of wireless application or wireless device detected by the wireless access point, and restricted access to the WAN to a second type of wireless application or wireless device detected by the wireless access point.

3 Claims, 7 Drawing Sheets

U.S. PATENT DOCUMENTS

2005/0243802 A1 11/2005 Barclay et al.
2006/0003796 A1* 1/2006 Vireday et al. ............ 455/550.1
2006/0114839 A1* 6/2006 Meier et al. .................. 370/254
2006/0117174 A1 6/2006 Lee
2006/0153122 A1 7/2006 Hinman et al.

FOREIGN PATENT DOCUMENTS

WO WO 2006/076626 A2 7/2006

OTHER PUBLICATIONS

U.S. Appl. No. 11/035,452, Office Action dated Dec. 12, 2007, 18 pages.

PCT International Preliminary Report and Written Opinion PCT/US2006/001319, International filing date Jan. 12, 2006, mailing date Jul. 26, 2007, 11 pages.

PCT International Search Report and Written Opinion of the International Searching Authority, mailed Jul. 12, 2006, International Application No. PCT/US2006/001319, International filing date Jan. 12, 2006.

Jim Geier, "Implementing Multiple SSIDs", http://www.wi-fiplanet.com/tutorials/article.php/2196451, Apr. 24, 2003, pp. 3 total.

Joe Mehaffey, "Setup Cisco AP342s, Ap352s and BR352s used as Access Points and Repeaters for Home HotSpots/WISPs and How to Setup the AP342, AP352 and BR352 for Optional Encryption and as Repeaters**", http://gpsinformation.net/articles/cisco352.html, Jan. 27, 2004, pp. 16 total.

U.S. Appl. No. 11/035,452, Office Action dated Jul. 1, 2008, 15 pages.

* cited by examiner

METHOD AND APPARATUS FOR CONTROLLING WIRELESS ACCESS TO A NETWORK

TECHNICAL FIELD

The invention relates to controlling wireless access to networks in general and, in particular, to controlling access to networks by classifying wireless devices and applications.

BACKGROUND

Wireless Fidelity (Wi-Fi) is a wireless local area network (WLAN) protocol compatible with IEEE Standard 802.11b or 802.11a that is used for wireless home and business networks, and at Wi-Fi "Hotspots" where wireless device users can connect to the Internet. As shown in FIG. 1, a conventional WLAN 100 is structured around a wireless access point (WAP) 101 that acts as a wireless network server, transmitting and receiving data, and providing connectivity, among wireless client devices 102-1 through 102-n. In addition, the WAP 101 serves as the point of interconnection between the WLAN 100 and a wired LAN 103. The WAP 101 can also serve as a gateway to a wide area network (WAN) 104, such as the Internet, in which case the WAP 101 may include a router core 105. To handle local traffic (i.e., traffic on the WLAN 100 and LAN 103), the router 105 examines each data packet header and determines, from an embedded physical address in each incoming message frame, which network port to forward the data. For incoming Internet traffic, the router uses a lookup table to associate a destination IP address with a hardware address on the local network. For outgoing Internet traffic, the router uses the lookup table to associate a hardware address on the local network with a source IP address in the Internet data packet header As in the case of a wired LAN, each wireless device on the wireless network has a physical address and an assigned network address. The physical address is usually associated with a wireless network adapter or interface in the wireless device. Under the IEEE 802 Ethernet standard, the physical address is a 48-bit address known as the media access control (MAC) address. The first 24 bits of the address are an organization unique identifier (OUI), assigned by the IEEE, which uniquely identifies the manufacturer of the adapter. A manufacturer may have several different OUI's corresponding to different product lines or product types. The last 24 bits of the MAC address are administered by the hardware manufacturer and are used to identify a unique piece of hardware produced by the manufacturer. The 24 bits allow for $2^{24}$ (more than 16 million) unique MAC addresses for each OUI. The 48 bits of the MAC address are usually grouped into six binary octets and written as a sequence of eight pairs of hexadecimal digits. In practice, the manufacturer of a wireless interface burns the 48-bit address into read only memory (ROM) on the wireless interface. As part of a network protocol, the WAP obtains the MAC address from the wireless device and creates a lookup table that maps the MAC address to an Internet address obtained from a DHCP (dynamic host configuration protocol) server.

In the IEEE 802.11 standard, a wireless network is identified by a service set identifier (SSID). The SSID is a label that distinguishes one wireless network from another, and all devices on the network should use the same SSID in order to establish communications. The WAP on a public network is normally configured to broadcast its SSID so that a wireless device searching for a network connection can discover it. The SSID broadcast allows a wireless adapter's client manager program or an operating system's built-in wireless software (e.g., Windows Zero Configuration software) to provide a list of the access points in range, or to automatically connect with an available access point by setting its own SSID to match. In contrast, the WAPs of private home and business WLANs are usually configured to suppress the SSID broadcast because the radio frequency signal transmitted by the WAP can travel through walls and other non-metallic barriers, and can be intercepted by unauthorized users outside of the home or business.

To provide an additional level of security against unauthorized access, private home and business networks normally encrypt the data that is transmitted and received by the WAP. The most common encryption scheme uses a Wired Equivalent Privacy (WEP) key to encrypt and decrypt data transmissions, providing a level of security equivalent to that of wired networks. WEP is a security protocol, specified in the IEEE Wi-Fi standard, 802.11b. In WEP encryption, a password is used in a hashing algorithm to generate a keyword, and the keyword is then used in another algorithm to encrypt and decrypt data. With WEP encryption, only those users with the right combination of SSID and keyword can establish a connection and communicate on the network.

In contrast to private home and business networks, a Wi-Fi hotspot is designed to provide public access to the Internet, sometimes for free and sometimes for a fee. The network SSID is broadcast by the WAP and the data transmissions are unencrypted so that any wireless device within range of the WAP can detect the SSID, configure its own SSID to match, and can then communicate on a clear (i.e., unencrypted) channel. However, accessing the Internet through a Wi-Fi hotspot usually requires an additional verification or authorization step where the user verifies that an access fee has been paid (e.g., as evidenced by a password) or actually pays an access fee in an online transaction. Until the verification or authorization step is completed, the wireless users are kept in a "walled garden."

A walled garden refers to a limited browsing/network environment that controls the network resources, information, web sites and other Internet locations that a user is able to access. For example, when a hotel guest attempts to gain Internet access through the hotel's WAP, the guest will be redirected to a local web page (instead of his browser's home page). The local web page may request a password to verify a prior fee payment, or request some form of electronic payment or billing before the access is granted. Thereafter, for some limited time based on the fee paid, the guest may, for example, have unrestricted access to the Internet or remote access to peripherals (e.g., printers, scanners) in the hotel's business center.

A private home or business network operator may also want to provide limited public access to the Internet, or access to network resources, without compromising overall network security. For example, a homeowner may want to provide such access to a visitor or guest without revealing the network's SSID and security key, or a retail establishment may want to provide transient Internet access to its customers while maintaining security on its inventory and accounting records.

One approach used in the prior art is to provide two SSID's at the WAP, as shown in FIG. 2, which logically divides the access point into two virtual access points. In FIG. 2, two SSIDs (SSID1 and SSID2) at WAP 201 allow wireless devices 202 and 203 to access two different logical (virtual) or physical networks through a single wireless access point 201, and network managers can assign different access policies and functions for each SSID at the router 205. SSID1 can be assigned, for example, to LAN 204 and SSID2 can be assigned to LAN 206. LAN 204 can be configured as a public network, where its SSID1 will be broadcast, data transmissions will be unencrypted and users are placed in a walled garden 208 with controlled or restricted access to the Internet 207 and local network resources on LAN 204. LAN 206 can be configured as a private network, where its SSID2 will not be broadcast, data transmissions will be encrypted, and the network will only be accessible to those users with the correct SSID and encryption key.

The problem with both the walled garden approach and the dual SSID approach is that all users on a particular public network are treated the same way. Unlike a private network, where the network rights and privileges of each client can be individually set by the network administrator, there is no way to distinguish one wireless application or device from another on the public network. That is, the wireless access point does not detect what type of device or application is in use and is therefore unable to implement an access control policy based on the type of use.

One approach to this problem is to set up each type of use on a separate public VLAN, with a separate SSID and VLAN specific access policies. Consider, for example, a Wi-Fi network operator who wants to provide free Internet access for low bandwidth uses like text messaging or voice over Internet Protocol (VoIP) telephony, and fee-based access for high-bandwidth uses like web browsing, using a walled garden approach. A VLAN for each service would have to be set up, data rate policies would have to be established on each VLAN, and users would have to know the SSID of the VLAN corresponding to the service they want to use. Such a system could be costly and difficult to maintain, and confusing to potential users.

SUMMARY OF AN EMBODIMENT OF THE INVENTION

In one embodiment of the invention, a wireless access point having an identifier associated with a local area network provides wireless access to a wide area network through the local area network. The wireless access point is configured to detect a wireless device or a wireless application, and to implement an access policy that provides at least a first class of access to a first class of wireless device or wireless application and a second class of access to a second class of wireless device or wireless application.

DETAILED DESCRIPTION

In the following description, numerous specific details are set forth such as examples of specific components, devices, methods, etc., in order to provide a thorough understanding of embodiments of the present invention. It will be apparent to one skilled in the art, however, that these specific details need not be employed to practice embodiments of the present invention. In other instances, well-known materials, methods or devices have not been described in detail in order to avoid unnecessarily obscuring embodiments of the present invention A system, apparatus and method for controlling wireless access to a network are described. In one embodiment, and as described in greater detail below, a wireless access point (WAP), which otherwise operates in a conventional manner to provide access to a local area network (LAN) and the Internet, is configured to detect and classify wireless devices and wireless applications and to implement network access control policies based on the classification of the wireless device or wireless application.

The WAP provides wireless access to a local area network (LAN) and is capable of providing access to a wide area network (WAN) such as the Internet. The WAP is configured with a public identifier that is associated with a public segment of the LAN, which may be the entire LAN or a portion of the LAN. The public segment of the LAN may be a physical subnet of the LAN or a logical subnet of the LAN comprising a virtual LAN (VLAN). The public identifier is broadcast by the WAP in a conventional manner to wireless devices within the radio frequency range of the WAP so that a wireless device can configure its own identifier to match the WAP identifier, and establish a connection with the WAP to gain access to the public segment of the LAN.

Figure 1:
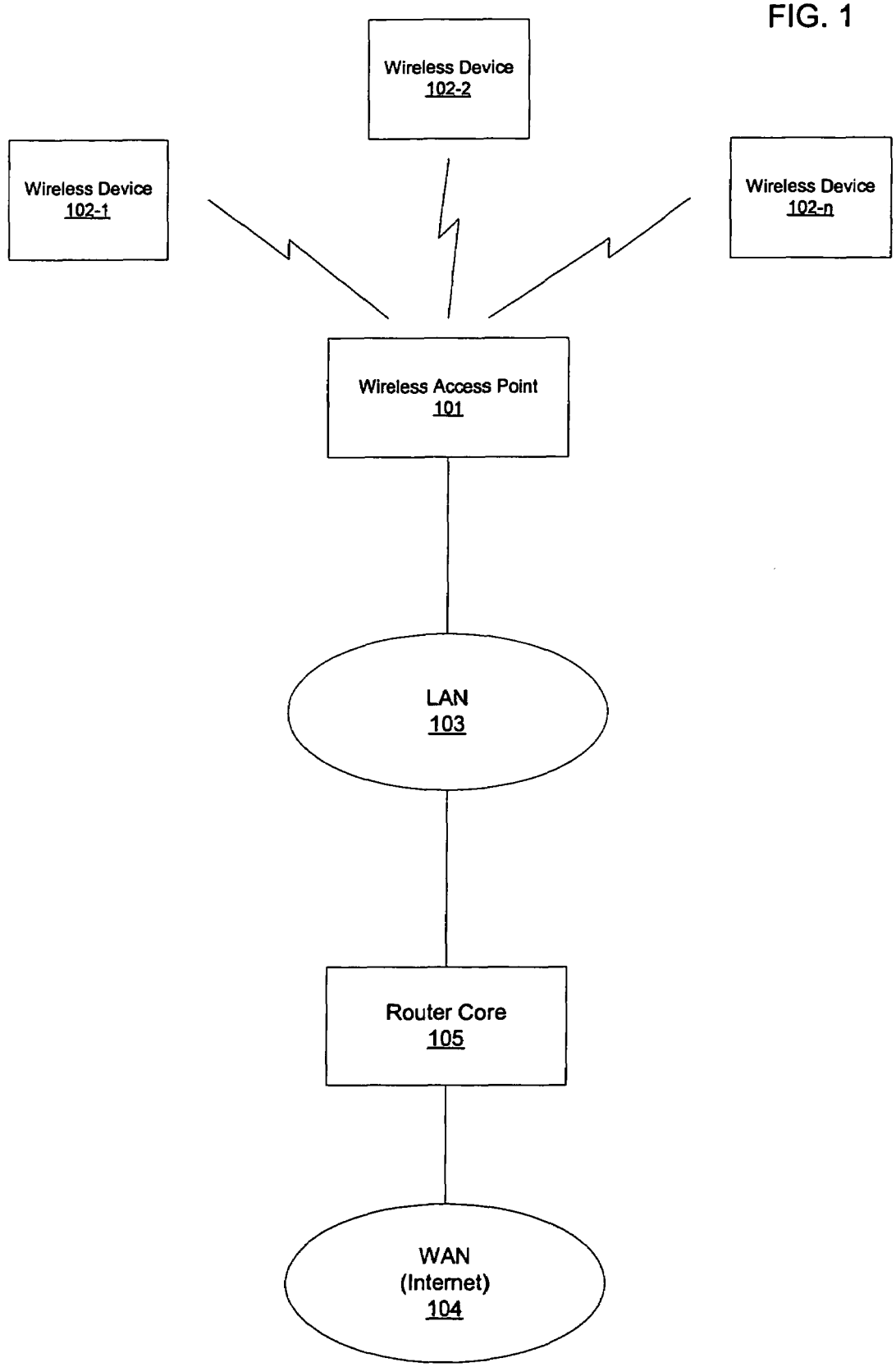
FIG. 1 illustrates a conventional wireless LAN configuration.
Figure 2:
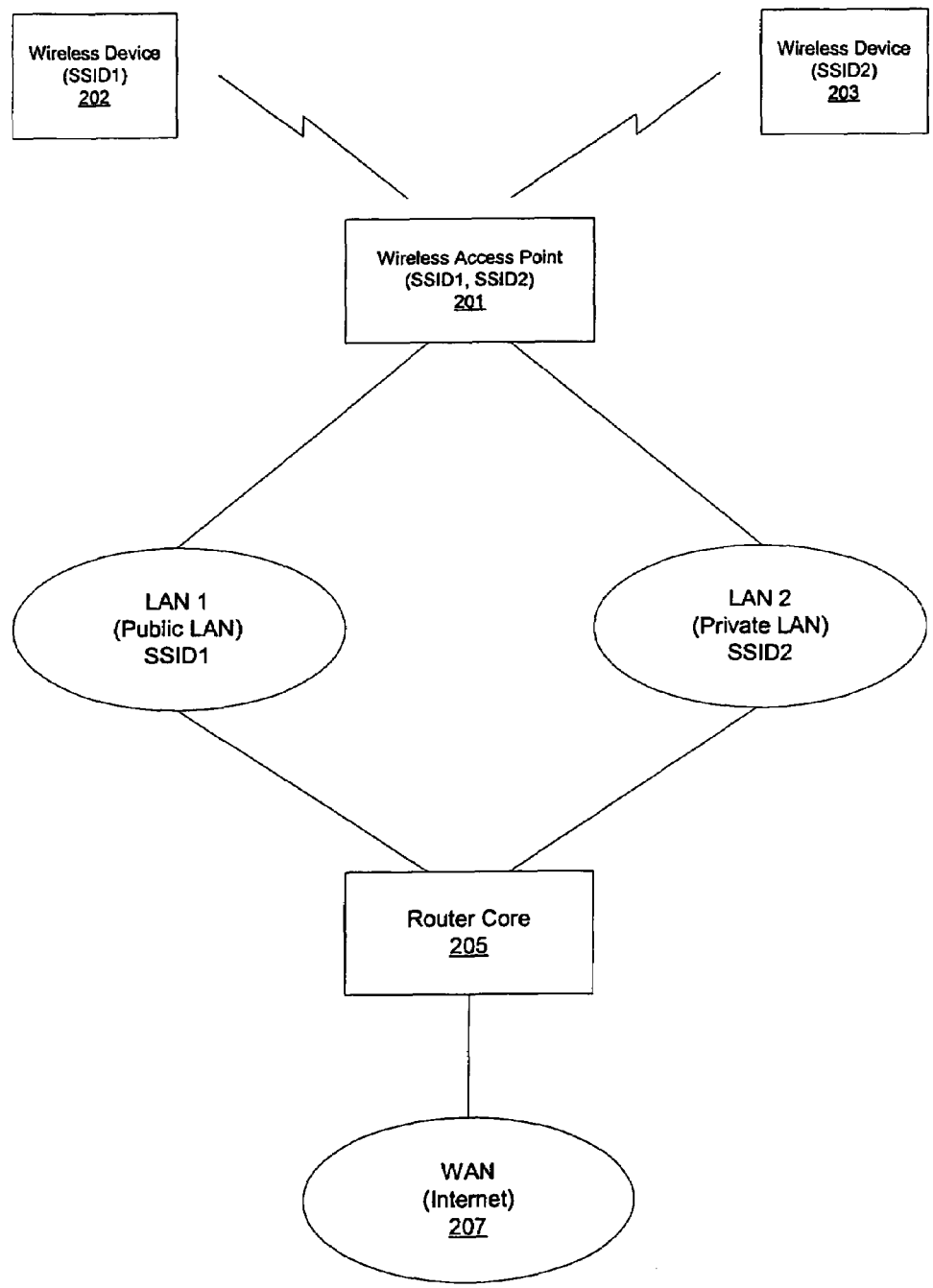
FIG. 2 illustrates a conventional dual SSID wireless LAN configuration.
Figure 3:
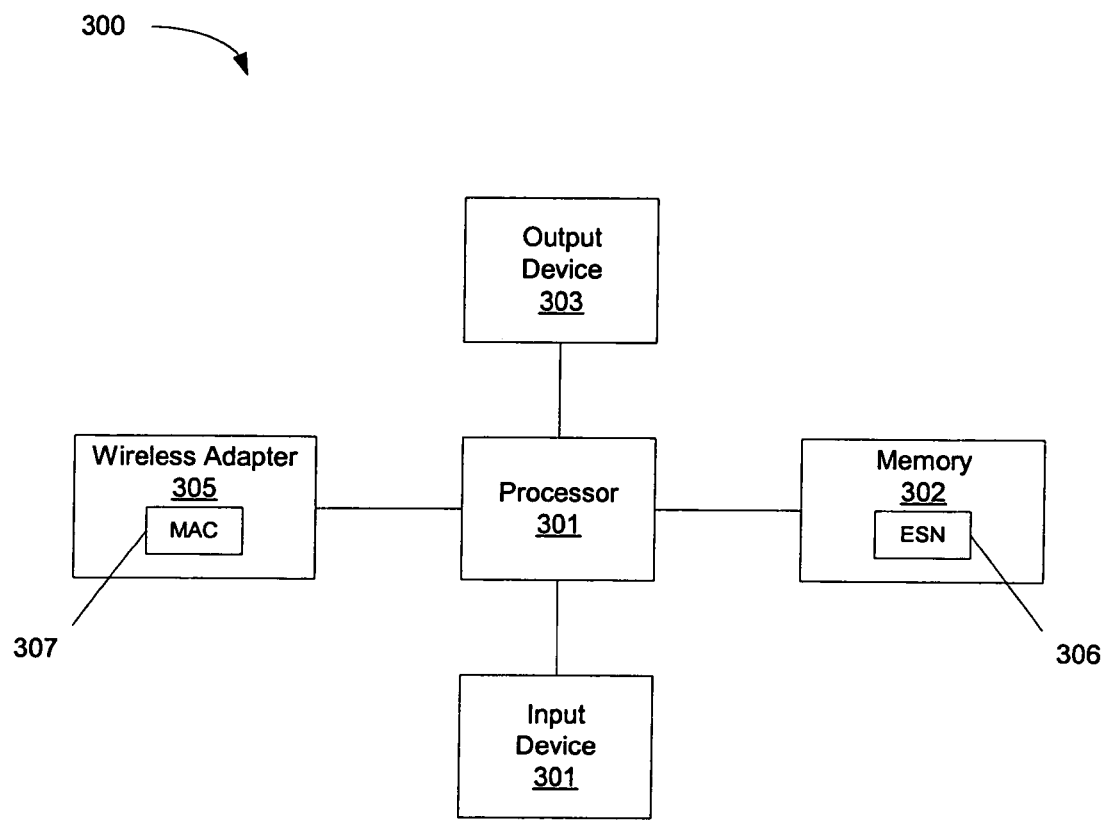
FIG. 3 illustrates an embodiment of a wireless device.

The wireless device may be, for example, a wireless PDA (personal digital assistant), a wireless tablet computer, a laptop computer with a wireless adapter, a Wi-Fi enabled cellular telephone, or a computer running a soft phone application. In one embodiment, as illustrated in FIG. 3, a wireless device 300 may include a processor 301 coupled to a memory 302, an input device 303, an output device 304 and a wireless adapter 305. The processor 301 may be a general-purpose processor such as an Intel Pentium™ processor or a Motorola PowerPC™ processor or a similar processor. Alternatively, the processor 301 may be a special purpose processor such as a field programmable gate array (FPGA), an application specific integrated circuit (ASIC), a digital signal processor or a similar device. The memory 302, used for storing data and program instructions, may be any kind of memory including, but not limited to, a volatile or non-volatile random access memory (RAM), a read only memory (ROM), or some combination thereof. Memory 302 may include a memory element 306, which may contain an electronic serial number that may be used to identify the wireless device 300. The input device 303 may be any type of tactile, visual, audio or mechanical input device, including but not limited to a touch screen, a keyboard, a mouse and a microphone. The output device 304 may be a video display device such as a liquid crystal display (LCD) or similar device. Alternatively, the output device 304 may be an audio output device such as a speaker or headset. The wireless adapter 305 may be any type of wireless adapter including, but not limited to, a wireless Ethernet compatible adapter, a Bluetooth compatible adapter or any other proprietary or non-proprietary wireless adapter. The wireless adapter 305 may be a physically separate component of wireless device 300, or it may be an integral part of processor 301. Wireless adapter 305 may include a memory element 307, which may contain a hardware identifier such as, for example, a MAC address.

Figure 4:
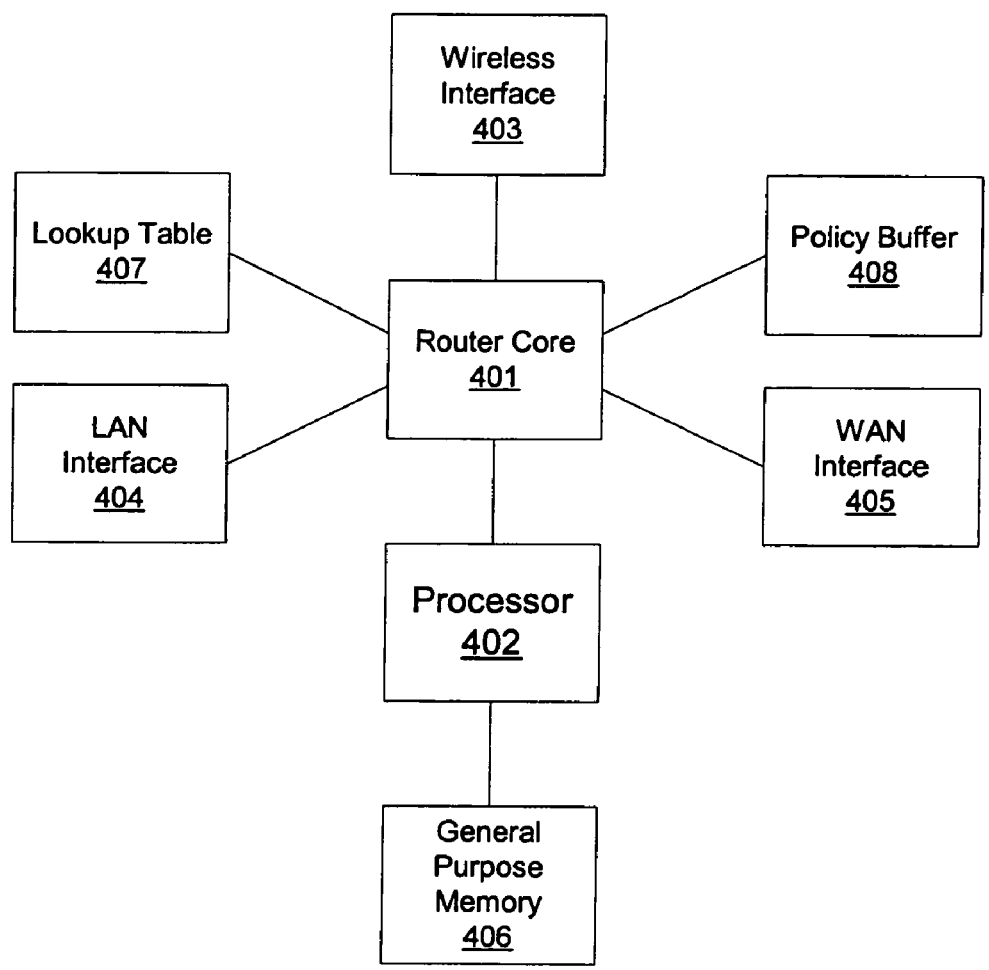
FIG. 4 illustrates an embodiment of a wireless access point.

FIG. 4 illustrates a wireless access point (WAP) 400 in one embodiment. WAP 400 may include a router core 401 interconnected with a processor 402, a wireless interface 403, a LAN interface 404 and a WAN interface 405. Processor 402 may also be connected to general-purpose memory 406. Wireless interface 403 may be a conventional digital transceiver configured to support one or more wireless networks having one or more network identifiers, which may be wireless Ethernet SSIDs. Wireless interface 403 may translate each SSID to a network point of presence at router core 401. Similarly, LAN interface 404 may provide a network point of presence for a LAN, such as LAN 204. WAN interface 405 may provide a network point of presence for a WAN, such as WAN 207. Processor 402 may be a general-purpose processor such as an Intel Pentium™ processor or a Motorola PowerPC™ processor or a similar processor. Alternatively, the processor 402 may be a special purpose processor such as a field programmable gate array (FPGA), an application specific integrated circuit (ASIC), a digital signal processor or a similar device. General purpose memory 406, used for storing data and program instructions, may be any kind of memory including, but not limited to, a volatile or non-volatile random access memory (RAM), a read only memory (ROM), or some combination thereof. As described in greater detail below, WAP 400 may also include a lookup table 407 to translate network addresses, and a policy buffer 408, containing network access policies for each type of wireless device or wireless application.

In one embodiment, the WAP 400 may be configured to detect a type of wireless device 300 by reading the MAC address in memory location 307 of wireless device 300 and comparing the MAC address with a table of MAC addresses in lookup table 407. For example, wireless device 300 may be a VoIP cell phone manufactured by Motorola, in which case the OUI portion of the MAC address might be 00A0BF. Upon receiving the MAC address from wireless device 300 through wireless interface 403, router core 401 would compare the OUI with a cross-reference table in lookup table 407 to determine that wireless device 300 is a Motorola cell phone. Then, router core 401 might access policy buffer 408 to determine what network rights and privileges to assign to a cell phone in general, a Motorola cell phone in particular, or a Motorola cell phone that is registered with a particular cellular provider. For example, the owner of the WAP 400 may have a contract with a cellular provider to provide Internet access to users of Motorola cell phones, with VoIP capability, with a particular range of MAC addresses that identifies subscribers to the cellular service. Alternatively, the functions provided to router core 401 by lookup table 407 and policy buffer 408 could be provided remotely through WAN interface 405 by accessing a predetermined IP address where the data is maintained.

In another embodiment, the function of the MAC address in memory element 307 in wireless adapter 305 of wireless device 300 could be replaced or supplemented by the electronic serial number (ESN) in memory element 306 of memory 302 of wireless device 300. For example, the MAC address could be used to identify the type of wireless device in use, and the ESN, which is normally assigned by a service provider, could be used to route the network traffic (VoIP in this example) to or through the service provider. Such a system could, for example, be used to allow users of suitably equipped cell phones to roam seamlessly between a cellular system connection and an Internet connection.

The same approach may be used to restrict access to the Internet. For example, if wireless device 300 were a laptop computer and wireless adapter 305 were an IEEE 802.11b wireless Ethernet adapter, then router core 401 could obtain the MAC address from wireless adapter 305 and use lookup table 407 to determine that wireless device 300 was configured as an 11 Megabit per second (Mbps) device. Policy buffer 408 could then be used to determine a network access policy based on that data rate. For example, the owner of the WAP could place wireless device 300 in a walled garden, blocked from WAN (Internet) and/or LAN access as described above, pending a subsequent action by the user (e.g., entering a password or paying a fee via some form of online transaction). Alternatively, access to the Internet may be blocked unconditionally at the discretion of the WAP owner.

In another exemplary embodiment, the WAP 400 may be configured to detect a type of wireless application by detecting the data protocol used by the wireless application, and classifying the application as a high data rate (wideband) application or a low data rate (narrowband) application. A low data rate application may include, for example, a text messaging application on or a voice application. A high data rate application may include, for example, a web browser running on a personal computer with a wireless Ethernet adapter. In general, an application may be classified as a low data rate (narrowband) application if the data rate is approximately less than 100 kilobits per second (Kbps). An application may be classified as a high data rate (wideband) application if the data rate is approximately greater than 100 Kbps. For example, an Internet Telephony application, which is typically a low data rate application, could be classified as a narrowband application by recognizing the data packet structure of the voice over Internet protocol (VoIP) that the telephony application uses. On the other hand, a web browser application, which can be a high data rate application, could be classified as a wideband application by recognizing the data packet structure of the hypertext transfer protocol (HTTP) that the browser application uses. Once the application is classified (e.g., by matching the data structure to an entry in lookup table 407), the network access policy matching the application can be obtained from the policy buffer 408. For example, the access policy for a telephony application might be unrestricted access, while the access policy for the browser application might be restricted access, as described above.

Figure 5:
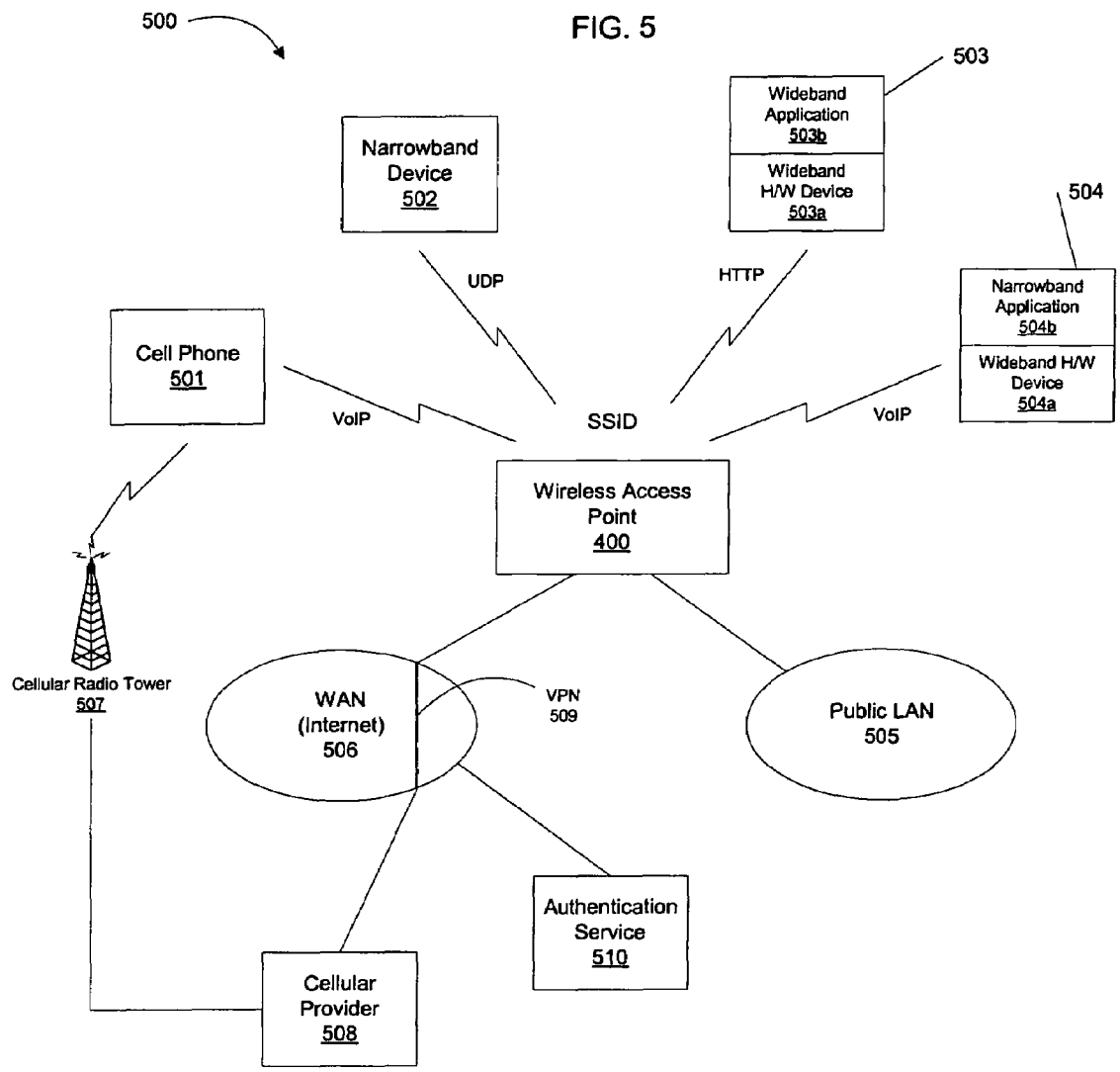
FIG. 5 illustrates one embodiment of a system for controlling wireless access to a network.

FIG. 5 illustrates one embodiment of a system 500 for controlling wireless access to a network according to the present invention. Wireless access point (WAP) 400, as described above, is configured with a public SSID which is broadcasted to wireless devices 501, 502, 503 and 504 which establish communication with WAP 400 by configuring their own SSIDs to match. Wireless device 501 may be a cell phone, as shown, equipped with VoIP capability as discussed above. Wireless device 502 may be any type of narrowband device such as a text messaging device or a wireless PDA, for example. Wireless device 503 may consist of a wideband hardware device 503a, such as a laptop computer with a wireless Ethernet adapter, and a wideband application 503b such as a web browser or streaming multimedia application. Wireless device 504 may consist of a wideband hardware device 504a, like wideband hardware device 503a, and a narrowband application 504b such as a soft telephone application. WAP 400 is coupled to public LAN 505. Public LAN 505 may be a wired LAN or a wireless LAN. Public LAN 505 may also be a physical subnet or a logical subnet of a larger LAN (not shown). WAP 400 is also connected to WAN 506, which may be the Internet.

In one embodiment, WAP 400 may classify wireless device 504 by reading a MAC address in a wireless adapter (such as wireless adapter 305) in wideband hardware device 504a. WAP 400 may also classify wireless device 504 by detecting a data protocol used by narrowband application 504b, such as a VoIP protocol. WAP 400 may then apply an access policy, based on the detected combination of hardware 504a and application 504b, which may then allow access to WAN 506 by wireless device 504. WAP 400 may classify wireless device 503 by reading a MAC address in a wireless adapter (such as wireless adapter 305) in wideband hardware device 503a. WAP 400 may also classify wireless device 503 by detecting a wideband data protocol used by wideband application 503b, such as an HTTP protocol. WAP 400 may then apply an access policy, based on the detected combination of hardware 503a and application 503b, which may restrict access to WAN 506 by wireless device 503. WAP 400 may classify narrowband wireless device 502 by reading a MAC address (e.g., a MAC address in memory location 307) or an ESN (e.g., an ESN in memory location 306) in narrowband device 502, and classifying narrowband device 502 as a narrowband device using lookup table 407 and policy buffer 408 in WAP 400 as previously described. WAP 400 may then apply an access policy to narrowband device 502 which may allow unrestricted access to WAN 506.

As noted above, wireless device 501 may be a Wi-Fi enabled cell phone equipped with VoIP capability. Wi-Fi enabled cell phone 501 may be wirelessly connected to a cellular provider 508 via cellular antenna site 507. In one embodiment, Wi-Fi enabled cell phone 501 roams onto a WLAN supported by WAP 400, detects the SSID and configures itself with a matching SSID. The Wi-Fi enabled cell phone 501 pulls an IP address from a DHCP (dynamic host control protocol) server in a conventional manner and attempts to establish a virtual private network (VPN) tunnel back to cellular provider 508 through the Internet (506). WAP 400 may read a destination IP address in the tunneling protocol and may use lookup table 407 to determine that the IP destination address is associated with a known cellular provider. If the policy associated with the known cellular provider allows a VPN connection, the VPN tunneling protocol is honored and a VPN 509 is established Once VPN 509 is established, the Wi-Fi enabled cell phone 501 authenticates itself to the cellular service provider and voice traffic is switched from the cellular system to a VoIP via the IP tunnel established through the wireless LAN and the Internet.

In another embodiment, the WAP 400 may read a MAC address or ESN in Wi-Fi enabled cell phone 501 and use the MAC address or ESN in a hashing algorithm to generate a unique password and/or encryption key for the Wi-Fi enabled cell phone 501 that can subsequently be verified by an authentication service 510 (e.g., RADIUS authentication).

Figure 6:
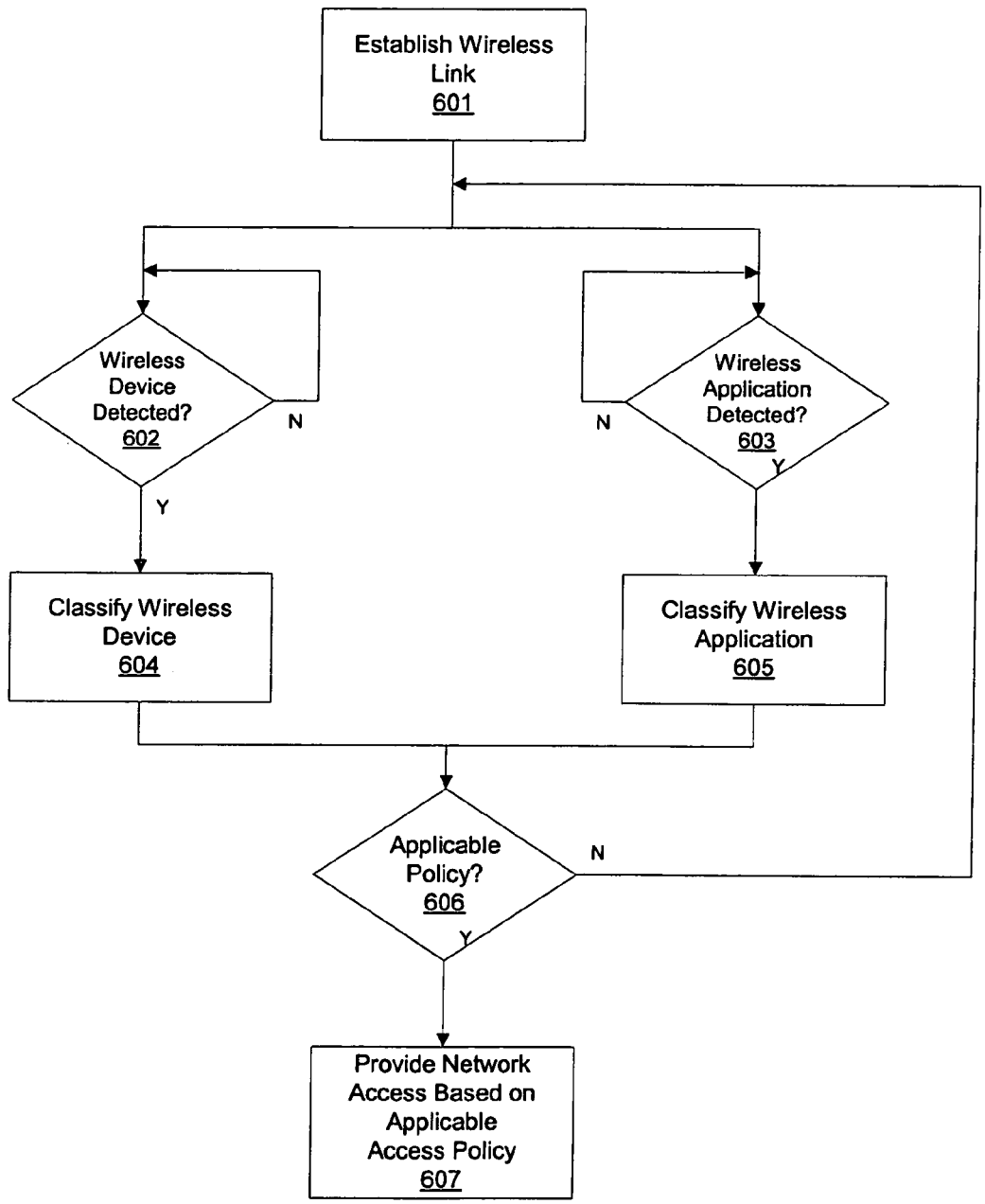
FIG. 6 illustrates one embodiment of a method for controlling wireless access to a network.

FIG. 6 illustrates one embodiment of a method for controlling wireless access to a network. The method begins by establishing a wireless link between a wireless access point (WAP) and a wireless device at operation 601. At operation 602, the WAP attempts to detect a wireless device type. If the WAP detects a type of wireless device at operation 602, it classifies the wireless device at operation 604. If the WAP cannot detect a type of wireless device, it repeats operation 602. At operation 603, the WAP attempts to detect a wireless application type. If the WAP detects a type of wireless application at operation 603, it classifies the wireless application at operation 605. At operation 606, the WAP determines if an access policy applies to the class of wireless device and/or class of wireless application. If an access policy applies at operation 606, the access policy is applied at operation 607. If no access policy applies at operation 606, the method returns to operations 602 and 603.

Figure 7:
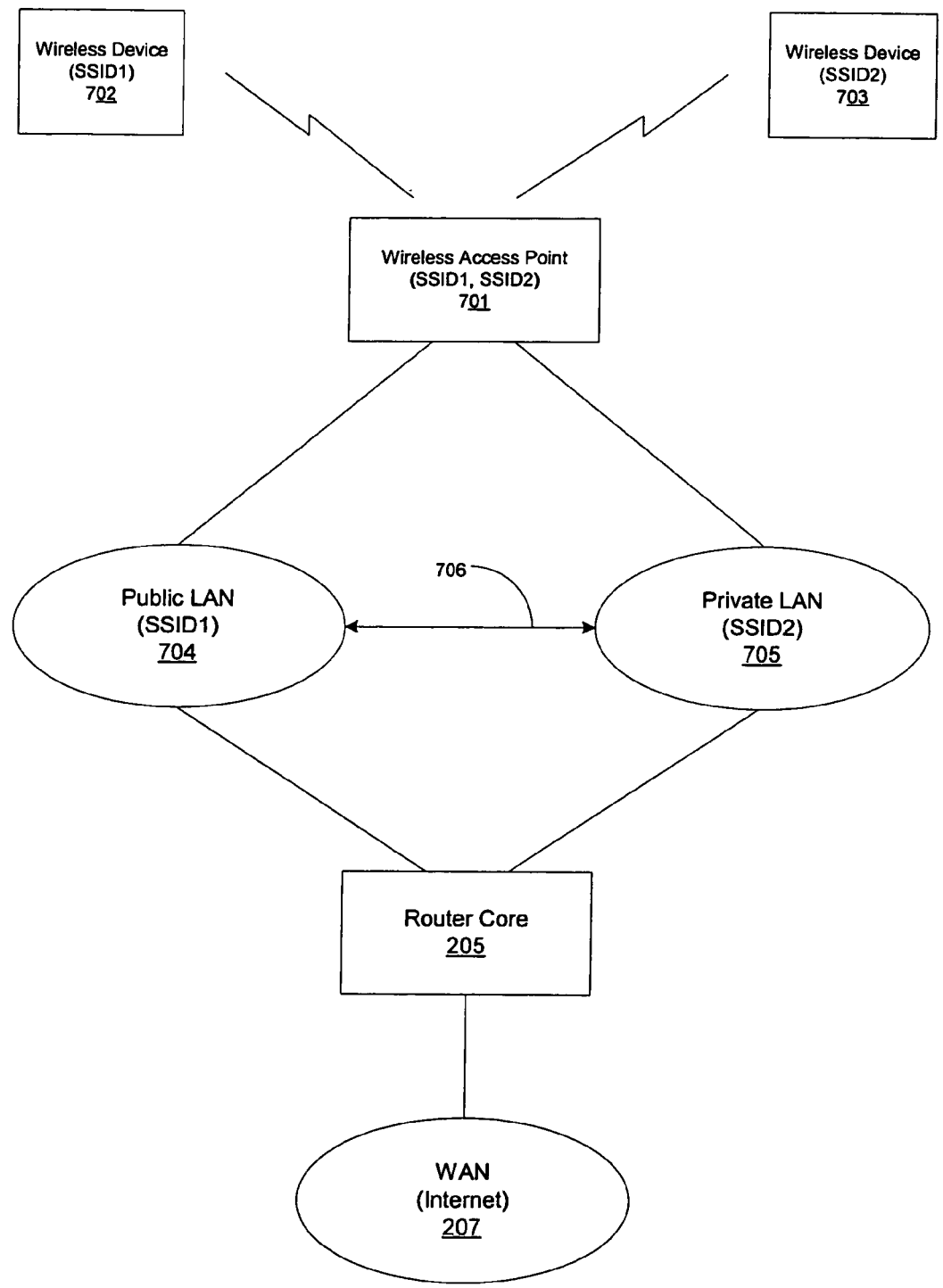
FIG. 7 illustrates another embodiment of controlling wireless access to a network.

FIG. 7 illustrates another embodiment of controlling wireless access to a network. In FIG. 7, wireless access point 701 is configured with a first identifier and a second identifier which may be service set identifiers SSID1 and SSID2, as shown, or any other type of identifier which may be associated with a local area network. In FIG. 7, SSID1 may be associated with public LAN 704 and SSID2 may be associated with private LAN 705. Public LAN 704 and private LAN 705 may each be a physically distinct LAN, a physical segment of a larger LAN, or a virtual segment of the larger LAN. Wireless device 702 may be configured to SSID1 and may be granted access to public LAN 704 by wireless access point 701. Wireless device 701 may be denied access to private LAN 705 directly through wireless access point 701 because wireless device 702 may not be configured to SSID2. However, wireless device 702 may be granted access to private LAN 705 through public LAN 704, via communication link 706 between public LAN 704 and private LAN 705. Access to private LAN 705 through public LAN 704 may be restricted or unrestricted based on access credentials provided by wireless device 702. Access credentials may be any kind of access credentials specified in IEEE 802.11 standard, a password, or other similar verification check. Access credentials may be verified using any of the detection and identification processes described above with respect to the detection and identification of wireless devices and applications.

Alternatively, a wireless device 703 may be configured to the second identifier (e.g., SSID2). Wireless device 703 may be granted restricted or unrestricted access to private LAN 705 based on access credential provided by wireless device 703.

Thus, a wireless device may access the private LAN through the public LAN while the wireless access point broadcasts a single SSID. Also, a wireless device may access the private LAN through a first SSID if the access credentials of the wireless device are proper and access the public LAN through a second SSID that is broadcast by the wireless access point.

Thus, a system, apparatus and method for controlling wireless access to a network have been described. It will be apparent from the foregoing description that aspects of the present invention may be embodied, at least in part, in software. That is, the techniques may be carried out in a computer system or other data processing system in response to its processor, such as processor 301, executing sequences of instructions contained in a memory, such as memory 302. In various embodiments, hardwired circuitry may be used in combination with software instructions to implement the present invention. Thus, the techniques are not limited to any specific combination of hardware circuitry and software or to any particular source for the instructions executed by the data processing system. A machine-readable medium can be used to store software and data which when executed by a data processing system causes the system to perform various methods of the present invention. This executable software and data may be stored in various places including, for example, general purpose memory 302 or any other device that is capable of storing software programs and/or data.

A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

It should be appreciated that references throughout this specification to "one embodiment" or "an embodiment"

means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method, comprising:
   receiving, by a wireless access point, an access request from a first type of wireless device or wireless application configured to a first service set identifier (SSID) but not a second SSID, the first SSID associated with a public LAN and the second SSID associated with a private LAN;
   granting the first type of wireless device or wireless application access to the public LAN;
   denying the first type of wireless device or wireless application direct access to the private LAN;
   granting the first type of wireless device or wireless application access to the private LAN through the public LAN, when the first type of wireless device or wireless application provides access credentials for the private LAN;
   receiving an access request from a second type of wireless device or wireless application, configured to the second SSID; and
   granting the second type of wireless device or wireless application direct access to the private LAN, wherein granting the second type or wireless device or wireless application direct access to the private LAN comprises granting restricted access to the private LAN when the second type of wireless device or wireless application does not provide access credentials for the private LAN.

2. The method of claim 1, wherein access is granted to the private LAN through the public LAN via a communication link.

3. An apparatus, comprising:
   a wireless access point configured to:
      receive an access a request from a first type of wireless device or wireless application configured to a first service set identifier (SSID) but not a second SSID, the first SSID associated with a public LAN and the second SSID associated with a private LAN
      grant the first type of wireless device or wireless application access to the public LAN;
      deny the first type of wireless device or wireless application direct access to the private LAN;
      grant the first type of wireless device or wireless application access to the private LAN through the public LAN, when the first type of wireless device or wireless application provides access credentials for the private LAN;
      receive an access request from a second type of wireless device or wireless application, configured to the second SSID; and
      grant the second type of wireless device or wireless application direct access to the private LAN, wherein granting the second type or wireless device or wireless application direct access to the private LAN comprises granting restricted access to the private LAN when the second type of wireless device or wireless application does not provide access credentials for the private LAN.

* * * * *